United States Patent
Kim et al.

(10) Patent No.: US 8,792,573 B2
(45) Date of Patent: Jul. 29, 2014

(54) METHOD AND APPARATUS FOR DATA TRANSMISSION BASED ON DISTRIBUTED DISCRETE POWER CONTROL IN COOPERATIVE MULTI-USER MULTI-INPUT MULTI-OUTPUT SYSTEM

(75) Inventors: Byoung-Hoon Kim, Gyeonggi-Do (KR); Wonjin Sung, Seoul (KR); Jaewon Chang, Seoul (KR); Jun-Ho Jo, Gyeonggi-Do (KR); Dong-Uk Lee, Seoul (KR); Jaewon Kim, Seoul (KR); Ki Jun Kim, Seoul (KP)

(73) Assignees: LG Electronics Inc., Seoul (KR); Industry University Cooperation Foundation, Sogang University, Seoul (KR)

( * ) Notice: Subject to any disclaimer, the term of this patent is extended or adjusted under 35 U.S.C. 154(b) by 197 days.

(21) Appl. No.: 13/378,038

(22) PCT Filed: Nov. 17, 2009

(86) PCT No.: PCT/KR2009/006737
§ 371 (c)(1),
(2), (4) Date: Dec. 13, 2011

(87) PCT Pub. No.: WO2011/002134
PCT Pub. Date: Jan. 6, 2011

(65) Prior Publication Data
US 2012/0093250 A1 Apr. 19, 2012

Related U.S. Application Data

(60) Provisional application No. 61/221,548, filed on Jun. 29, 2009.

(51) Int. Cl.
*H04L 5/12* (2006.01)
*H04L 23/02* (2006.01)

(52) U.S. Cl.
USPC .......... 375/261; 375/285; 375/296; 375/312; 375/346

(58) Field of Classification Search
USPC .............. 375/130–137, 140–153, 229–232, 375/259–297, 309–312, 316, 322, 325, 375/346–350
See application file for complete search history.

(56) References Cited

U.S. PATENT DOCUMENTS

| | | | |
|---|---|---|---|
| 2007/0005749 A1* | 1/2007 | Sampath | 709/223 |
| 2007/0064632 A1* | 3/2007 | Zheng et al. | 370/281 |
| 2010/0054200 A1* | 3/2010 | Tsai | 370/329 |

FOREIGN PATENT DOCUMENTS

| | | |
|---|---|---|
| KR | 10-0810271 | 3/2008 |
| KR | 1020080026620 | 3/2008 |
| KR | 1020080054089 | 6/2008 |

* cited by examiner

*Primary Examiner* — Sam K Ahn
*Assistant Examiner* — James M Perez
(74) *Attorney, Agent, or Firm* — Lee, Hong, Degerman, Kang & Waimey

(57) ABSTRACT

Disclosed are a method and apparatus capable of enhancing a closed loop multi-input multi-output (MIMO) capacity through distributed discrete power control in the case of cooperatively transmitting information to multiple users through a downlink.

12 Claims, 4 Drawing Sheets

| CODEBOOK + PC BIT NUMBER | | RATE [bps/Hz/BS] | | | GAIN OVER CT [%] | | | GAIN OVER NCT [%] | | |
|---|---|---|---|---|---|---|---|---|---|---|
| CT w/D²PC | CT,NCT | L1 | L2 | L3 | L1 | L2 | L3 | L1 | L2 | L3 |
| 2 + 2 + 1 | 2 + 2 | 2.0 | 8.2 | 14.6 | 3.1 | 332 | 692 | 18.8 | 0.36 | 0.01 |
| 2 + 2 + 2 | 2 + 2 | 2.0 | 8.2 | 14.6 | 5.2 | 332 | 693 | 21.2 | 0.39 | 0.12 |

METHOD AND APPARATUS FOR DATA TRANSMISSION BASED ON DISTRIBUTED DISCRETE POWER CONTROL IN COOPERATIVE MULTI-USER MULTI-INPUT MULTI-OUTPUT SYSTEM

CROSS-REFERENCE TO RELATED APPLICATIONS

This application is the National Stage filing under 35 U.S.C. 371 of International Application No. PCT/KR2009/006737, filed on Nov. 17, 2009, which claims the benefit of U.S. Provisional Application Ser. No. 61/221,548, filed on Jun. 29, 2009, the contents of which are incorporated by reference herein in their entirety.

TECHNICAL FIELD

The present invention relates to a wireless communication, and particularly, to a method and apparatus capable of enhancing a downlink transmission function through distributed discrete power control in a multi-input and multi-output (MIMO) system.

BACKGROUND ART

The next generation mobile communication systems and wireless transmission systems in multi-cell environments require an enhanced data transmission rate and system capacity. Accordingly, have been performed research for multi-input multi-output (MIMO) systems capable of transmitting data by using a plurality of antennas. Among the MIMO systems, a closed loop MIMO system enhances a data transmission function by utilizing fed-back channel information so as to enhance a data transmission rate in multi-cell environments.

FIG. 1 is a view showing a multi-cellular mobile communication system with consideration of cooperative transmission between base stations.

Referring to FIG. 1, a first base station 30 communicates with a first terminal 10, and a second base station 40 communicates with a second terminal 20.

The first and second terminals 10 and 20 feedback their channel information to one or more base stations 30 and 40. Accordingly, the fed-back information is shared between the respective base stations through a controller 50. Each station transmits information to each terminal based on channel information fed-back from the terminal. This may allow the base stations to efficiently communication with the terminals.

FIG. 2 is a configuration view of a Closed Loop Multi-Input Multi-Output (MIMO) system in accordance with the conventional art.

Referring to FIG. 2, the base station 30 denotes a transmitter, and the terminal 10 denotes a receiver.

The conventional closed-loop MIMO system comprises a base station 30, a transmission antenna 31, a terminal 10, and a reception antenna 11. And, a transmission signal is transmitted to the terminal 10 after passing through an H matrix.

The base station 30 includes a coding and modulation unit 32 configured to coding and modulation processes with respect to a transmission signal, a coding book 33, and a processor 34 for multiplying one weight vector included in the coding book 33 by the transmission signal.

The terminal 10 receives a signal transmitted from the base station 30 through the reception antenna 11, thereby demodulating the received signal by selecting one coding vector from the coding book 12.

The terminal 10 feedbacks its channel information to the base station 30, thereby allowing the base station 30 to efficiently communicate with itself based on the channel information.

Methods for enhancing a data transmission function by using channel information by the closed-loop MIMO system include a non-cooperative transmission method (1) and a cooperative transmission method (2).

The non-cooperative transmission method denotes a method for transmitting information, by a single base station, to a terminal based on channel environments of the terminal within a cell coverage. And, the cooperative transmission method denotes a method for transmitting information, by a plurality of base stations, to a plurality of terminals based on channel environments of the terminals within each cell coverage.

Firstly, will be explained a Signal-to-Noise Ratio (SNR) of the closed loop MIMO system based on a non-cooperative transmission method.

In the closed loop MIMO system based on a non-cooperative transmission method, an optimized system is designed without considering channel environments of other terminals. However, in the closed loop MIMO system based on a cooperative transmission method, an optimized system is designed with consideration of channel environments of other terminals. Accordingly, the conventional system is designed in an assumption that each channel is independently and identically distributed. The conventional system has the following configuration.

$N_R \times 1$ reception signal vectors received by a terminal (receiver) having $N_R$ antennas from a base station (transmitter) having $N_T$ antennas can be expressed as follows.

$$r = Hx + n = \begin{bmatrix} h_{11} & \cdots & h_{1N_T} \\ \vdots & \ddots & \vdots \\ h_{N_R 1} & \cdots & h_{N_R N_T} \end{bmatrix} \begin{bmatrix} w_1^i \\ \vdots \\ w_{N_T}^i \end{bmatrix} d + \begin{bmatrix} n_1 \\ \vdots \\ n_{N_R} \end{bmatrix} \quad \text{Equation 1}$$

Referring to the Equation 1, H denotes a channel matrix of $N_R \times N_T$, X is a transmission signal vector of $N_T \times 1$, and n denotes an additive white Gaussian noise (AWGN) vector of $N_R \times 1$. The transmission signal vector is $X = W_i d$, which is obtained by multiplying a pre-coding vector mapped to a codebook index (i) selected by the terminal from an $N_T \times L$ codebook matrix ($W = [W_1 \ldots W_L]$) composed of L pre-coding vectors, by a transmission data symbol (d).

$W_i$ for maximizing a reception signal strength at the terminal is determined by the following Equation 2 based on the aforementioned Equation 1. And, the terminal transmits a codebook index (i) mapped to $W_i$ to the base station, thereby requesting a pre-coding process.

$$i = \underset{k=1,\ldots,L}{\operatorname{argmax}} \{\|Hw_k\|^2\} \quad \text{Equation 2}$$

Once the resultant value obtained from the Equation 1 is processed with a signal received by the terminal by using a selected pre-coding vector, the following Equation 3 is obtained.

$$(Hw_i)^H r = \|Hw_i\|^2 d + (Hw_i)^H n \quad \text{Equation 3}$$
$$= \lambda_i d + (Hw_i)^H n$$

$\lambda_i$, denotes a beam-forming grain obtained by using $W_i$, and $\partial_n^2$ denotes power of an additive white Gaussian noise (AWGN) component. In this case, a Signal-to-Noise Ratio (SNR) can be expressed as the following Equation 4.

$$\gamma = \frac{\|Hw_i\|^2}{\|n\|^2} = \frac{\lambda_i}{\sigma_n^2} \qquad \text{Equation 4}$$

Next, will be explained the conventional closed loop MIMO system based on a cooperative transmission method. In this case, B base stations each having $N_T$ and K terminals each having $N_R$ participate in a cooperative transmission method. Here, $N=BN_T$ transmission antennas and $M=KN_R$ reception antennas operate between the B base stations and the K terminals. And, M×1 reception signal vectors received by the K terminals when the B base stations transmit signals through the channel matrix (M×N) can be expressed as the following Equation 5.

$$\tilde{r} = \tilde{H}\tilde{x} + \tilde{n} = \tilde{H}(\tilde{W}\tilde{d}) + \tilde{n} \qquad \text{Equation 5}$$

$$= \begin{bmatrix} \tilde{H}_1 \\ \vdots \\ \tilde{H}_K \end{bmatrix} [\tilde{w}_1 \ \ldots \ \tilde{w}_K]\tilde{d} + \tilde{n}$$

$$= \begin{bmatrix} H_{11} & \ldots & H_{1B} \\ \vdots & \ddots & \vdots \\ H_{K1} & \ldots & H_{KB} \end{bmatrix} \begin{bmatrix} w_{i_{11}} & \ldots & w_{i_{K1}} \\ \vdots & \ddots & \vdots \\ w_{i_{1,B}} & \ldots & w_{i_{KB}} \end{bmatrix} \begin{bmatrix} d_1 \\ \vdots \\ d_K \end{bmatrix} + \begin{bmatrix} n_1 \\ \vdots \\ n_K \end{bmatrix}$$

Here,
$\tilde{H}$
denotes a channel matrix of M×N,
$\tilde{x}$
denotes a transmission signal vector of N×1, and
$\tilde{n}$
denotes an additive white Gaussian noise (AWGN) vector of M×1.
$\tilde{W}=[\tilde{W}_1 \ldots \tilde{W}_K]$
denotes an M×K pre-coding matrix composed of pre-coding vectors to be used between the B base stations and the K terminals.
$\tilde{H}_m$
is a $N_R$×N channel matrix between the B base stations and the $m^{th}$ terminal. And,
$\tilde{W}_m$
denotes N×1 pre-coding vectors composed of B pre-coding vectors used for the $m^{th}$ terminal by the B base stations.

A channel ($H_{m\ n}$) denotes a $N_R$×$N_T$ matrix between the $n^{th}$ base station and the $m^{th}$ terminal. $W_{i\ m\ n}$ denotes $N_T$×1 pre-coding vectors determined to maximize a reception signal strength on the channel ($H_{m\ n}$) between the $n^{th}$ base station and the $m^{th}$ terminal. $d_m$ denotes a data symbol to be transmitted to the $m^{th}$ terminal, and $n_m$ denotes an additive white Gaussian noise (AWGN) vector of $N_R$×1 of the $m^{th}$ terminal. $W_{i\ m\ n}$ for maximizing a reception signal strength on the channel ($H_{m\ n}$) between the $n^{th}$ base station and the $m^{th}$ terminal is determined by the following Equation 6. And, the terminal transmits a codebook index ($i_{m\ n}$) mapped to $W_{i\ m\ n}$ to the base station, thereby requesting a pre-coding process.

$$i_{mn} = \underset{k=1,\ldots,L}{\operatorname{argmax}} \{\|H_{mn} w_k\|^2\} \qquad \text{Equation 6}$$

A signal received by the $m^{th}$ terminal can be expressed as the following Equation 7.

$$r_m = \tilde{H}_m(\tilde{W}\tilde{d}) + n_m \qquad \text{Equation 7}$$

$$= \tilde{H}_m[\tilde{w}_1 \ \ldots \ \tilde{w}_K]\tilde{d} + n_m$$

$$= \tilde{H}_m\tilde{w}_m d_m + \sum_{k=1,k\neq m}^{K} \tilde{H}_m\tilde{w}_k d_k + n_m$$

When applying 1×$N_R$ reception signal process vectors, $u_m = (\tilde{H}_m\tilde{w}_m)^H$, to the Equation 7 by using a selected pre-coding vector, the following Equation 8 is obtained.

$$u_m r_m = \|\tilde{H}_m\tilde{w}_m\|^2 + d_m + (\tilde{H}_m\tilde{w}_m)^H \left( \sum_{k=1,k\neq m}^{K} \tilde{H}_m\tilde{w}_k d_k + n_m \right) \qquad \text{Equation 8}$$

$$= \lambda_m d_m + n'$$

$\lambda_m$ denotes a beam-forming gain obtained through a cooperative transmission method. And, an SINR with consideration of an additive white Gaussian noise (AWGN) signal and a multi-use interference signal can be expressed as the following Equation 9.

$$\gamma = \frac{\|\tilde{H}_m\tilde{w}_m\|^2}{\left\| \sum_{k=1,k\neq m}^{K} \tilde{H}_m\tilde{w}_m d_k + n_m \right\|^2} \qquad \text{Equation 9}$$

That is, the conventional closed loop MIMO system based on a cooperative transmission method and a non-cooperative transmission method has capacity shown in the Equations 1 and 5. However, it is difficult to derive the Equation 5 in the case of the conventional closed loop MIMO system based on a cooperative transmission method. The reason is because each channel is not independently and identically-distributed in a cooperative transmission method while each channel is independently and identically-distributed in a non-cooperative transmission method. Accordingly, the conventional closed loop MIMO system is not suitable for the cooperative transmission method.

In order to solve this problem, have been required techniques for enhancing a data reception function and signal quality in non-identically distributed channel environments, and capable of effectively applying the techniques to cellular systems.

DISCLOSURE OF INVENTION

Solution to Problem

Therefore, an object of the present invention is to provide a method and apparatus for data transmission based on distributed discrete power control in a closed loop cooperative multi-input multi-output (MIMO) system, capable of enhancing a signal reception function and signal quality by optimizing reception signal quality in non-identically distributed channel environments.

Another object of the present invention is to provide a method and apparatus capable of utilizing the conventional cooperative transmission method and non-cooperative transmission method by enhancing data transmission efficiency and by implementing feedback signals having small number of bits.

Still another object of the present invention is to provide a method and apparatus capable of efficiently performing data communication by combining the conventional pre-coding technique used in a cooperative transmission method, with a distributed discrete power control method.

To achieve these and other advantages and in accordance with the purpose of the present invention, as embodied and broadly described herein, there is provided a method for data transmission based on distributed discrete power control in a closed loop cooperative multi-user multi-input multi-output (MIMO) system, the method comprising: coding and modulating a signal to be transmitted; receiving feedback information from a receiver; sharing a pre-coding index with receivers grouped for multi-user transmission, based on the feedback information; determining a distributed discrete power control level based on the feedback information; and transmitting, to the receiver, the signal to be transmitted having the determined distributed discrete power control level.

The distributed discrete power control level may be determined by performing Hadamard product with respect to a transmission signal and a distributed discrete power control matrix.

The feedback information may be a reception Signal to Interference-plus-Noise Ratio (SINR) of a terminal, and a pre-coding index of a pre-coding book of the terminal.

The distributed discrete power control matrix may be determined based on at least one of: a method for allocating much power to a base station having high signal power to be received by each terminal; and a method for allocating the same signal power to each base station by requesting a base station having low signal power so as to have increased signal power.

The pre-coding book may be a Discrete Fourier Transformation (DFT) based codebook.

To achieve these and other advantages and in accordance with the purpose of the present invention, as embodied and broadly described herein, there is also provided a base station for data transmission based on distributed discrete power control in a closed loop cooperative multi-user multi-input multi-output (MIMO) system, the base station comprising: a first processor configured to perform coding and modulating processes with respect to a signal to be transmitted; a receiver configured to receive feedback information from a terminal; a second processor configured to determine a distributed discrete power control level of the transmission signal based on the feedback information; and a transmitter configured to transmit the transmission signal.

The feedback information may be a reception Signal to Interference-plus-Noise Ratio (SINR) of the terminal, and a pre-coding index of a pre-coding book of the terminal.

The distributed discrete power control matrix may be determined based on at least one of: a method for allocating much power to a base station having high signal power to be received by each terminal; and a method for allocating the same signal power to each base station by requesting a base station having low signal power so as to have increased signal power.

The pre-coding book may be a Discrete Fourier Transformation (DFT) based codebook.

According to another aspect of the present invention, there is provided a method for data transmission based on distributed discrete power control in a closed loop cooperative multi-user multi-input multi-output (MIMO) system, the method comprising: determining feedback information; transmitting the determined feedback information to a transmitter; determining a distributed discrete power control level based on the feedback information; and transmitting a signal having the determined distributed discrete power control level to a terminal.

The distributed discrete power control level may be determined by performing Hadamard product with respect to a transmission signal and a distributed discrete power control matrix.

The feedback information may be a reception Signal to Interference-plus-Noise Ratio (SINR) of the terminal, and a pre-coding index of a pre-coding book of the terminal.

To achieve these and other advantages and in accordance with the purpose of the present invention, as embodied and broadly described herein, there is still also provided a terminal for data transmission based on distributed discrete power control in a closed loop cooperative multi-input multi-output (MIMO) system, the terminal comprising: a first processor configured to determine feedback information to be transmitted to a transmitter; a second processor configured to determine a distributed discrete power control level based on the feedback information; and a transmitter configured to transmit the feedback information to a base station, and transmit a signal to a base station based on the determined distributed discrete power control level.

The distributed discrete power control level may be determined by performing Hadamard product with respect to a transmission signal and a distributed discrete power control matrix.

The feedback information may be a reception Signal to Interference-plus-Noise Ratio (SINR) of the terminal, and a pre-coding index of a pre-coding book of the terminal.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
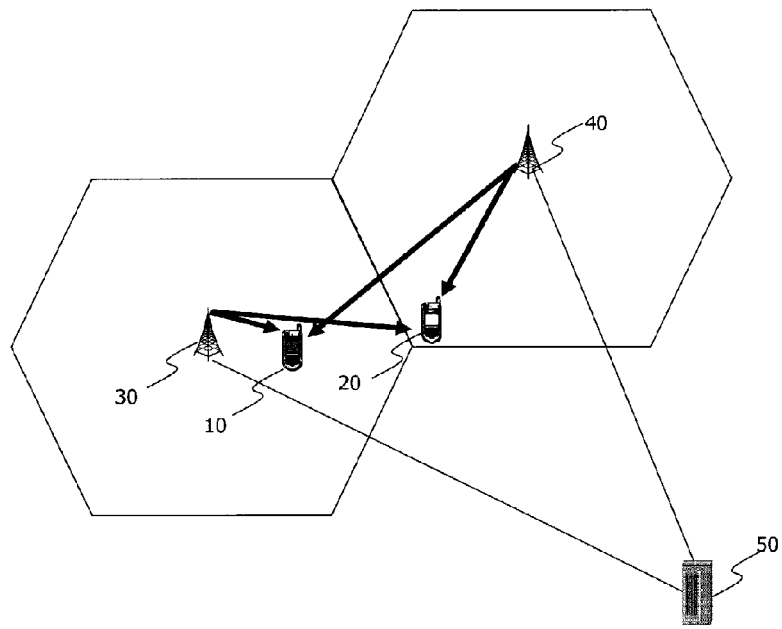
FIG. 1 is a view showing a multi-cellular mobile communication system with consideration of cooperative transmission between base stations.
Figure 2:
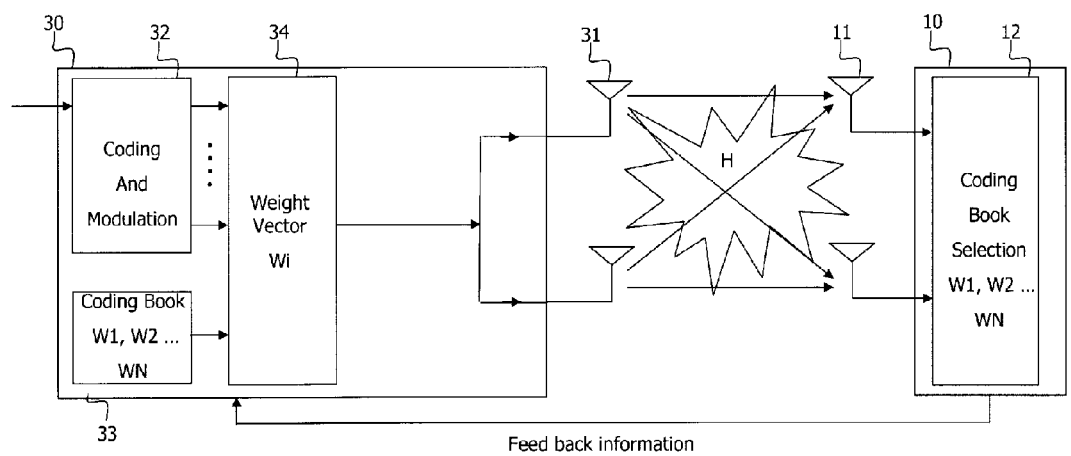
FIG. 2 is a configuration view of a Closed Loop Multi-Input Multi-Output (MIMO) system in accordance with the conventional art.

Description will now be given in detail of the present invention, with reference to the accompanying drawings.

Hereinafter, preferred embodiments of the present invention will be explained in more detail with reference to the attached drawings. The same or similar components of one embodiment as or to those of another embodiment will be provided with the same or similar reference numerals, and their detailed explanations will be omitted. And, if it is judged that detailed descriptions of the related art are not within the range of the present invention, the detailed descriptions will be omitted.

Figure 3:
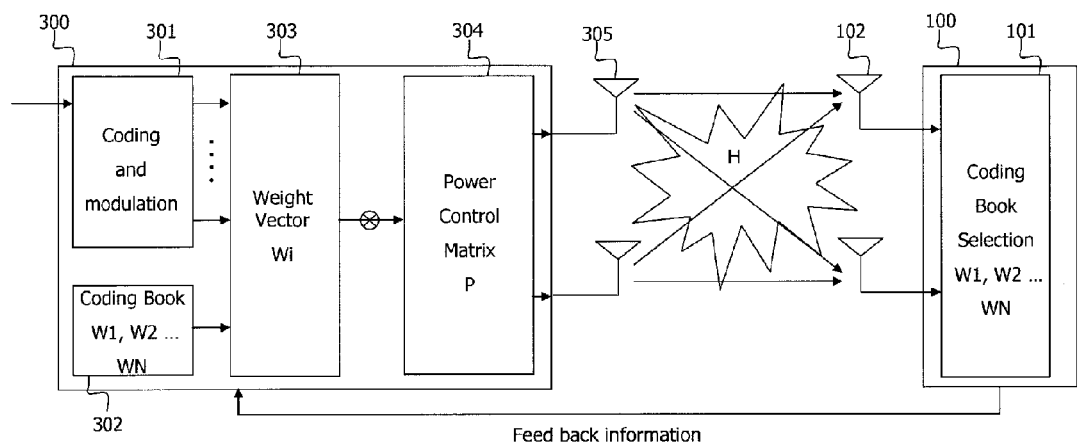
FIG. 3 is a configuration view of a system capable of optimizing reception signal quality through distributed discrete power control, in non-identically distributed channel environments, according to the present invention.

FIG. 3 is a configuration view of a system capable of optimizing reception signal quality through distributed discrete power control, in non-identically distributed channel environments, according to the present invention.

Referring to FIG. 3, a Closed Loop Multi-Input Multi-Output (MIMO) system according to the present invention comprises a transmitter 300, a transmitting antenna 305, a receiving antenna 102, and a receiver 100. And, signals are transmitted to the receiver 100 through a channel matrix (H matrix).

The transmitter may be a base station, and the receiver may be a terminal.

The transmitter 300 includes a coding modulation unit 301 for coding and modulating a transmission signal, a coding book 302, a first processor 303 for multiplying one weight vector included in the coding book 302 by the transmission signal, and a second processor 304 for performing Hadamard product with respect to the multiplied signal and a distributed discrete power control matrix.

In the closed loop MIMO system of the present invention, a signal is coded and modulated, and is multiplied by a weight vector. Then, the multiplied signal is transmitted to the receiver 100 after passing through a power control matrix and a channel matrix (H matrix).

The receiver 100 demodulates the signal received from the transmitter 300 by selecting one coding vector from the coding book 101.

And, the receiver 100 feedbacks the reception signal and information relating to a channel status to the transmitter 300, thereby enabling optimized communication.

Referring to FIG. 3, in the case that a plurality of base stations transmit signals to a plurality of users in a cooperative manner in multi-cell environments, a signal model may be shown in the following equation 10 with consideration of a power control matrix P and a weight vector $W_i$.

$$\tilde{r} = \tilde{H}\tilde{x} + \tilde{n} = \tilde{H}\{(\tilde{W} \cdot P)\tilde{d}\} + \tilde{n}$$

$$= \begin{bmatrix} H_{11} & \cdots & H_{1B} \\ \vdots & \ddots & \vdots \\ H_{K1} & \cdots & H_{KB} \end{bmatrix}$$

$$\left\{ \left( \begin{bmatrix} w_{i_{11}} & \cdots & w_{i_{K1}} \\ \vdots & \ddots & \vdots \\ w_{i_{1B}} & \cdots & w_{i_{KB}} \end{bmatrix} \cdot \begin{bmatrix} \sqrt{p_{11}} & \cdots & \sqrt{p_{K1}} \\ \vdots & \ddots & \vdots \\ \sqrt{p_{1B}} & \cdots & \sqrt{p_{KB}} \end{bmatrix} \right) \begin{bmatrix} d_1 \\ \vdots \\ d_K \end{bmatrix} \right\} +$$

$$\begin{bmatrix} n_1 \\ \vdots \\ n_K \end{bmatrix}$$

$\cdot$: Hadamard product

Equation 10

Here,
$\tilde{H}$
denotes a channel matrix of M×N,
$\tilde{X}$
denotes a transmission signal vector of N×1, and
$\tilde{n}$
denotes Additive White Gaussian Noise (AWGN) of M×1.
$\tilde{W}$
denotes a N×K pre-coding matrix composed of pre-coding vectors to be used between B base stations and K terminals. And, P is a Power Control (PC) matrix, which is multiplied by the pre-coding matrix
$(\tilde{W})$
by using the Hadamard product.

For understanding of the signal model, it is assumed that a base station has two antennas, and a terminal has two antennas. That is, in the case of applying the equation 10 to a system model in a M×N=4×4 channel where two base stations (B=2, each base station having $N_T$=2) and two terminals (K=2 each terminal having $N_R$=2) are implemented, the signal model of the present invention can be expressed as the following equation 11.

$$\tilde{r} = \begin{bmatrix} H_{11} & H_{12} \\ H_{21} & H_{22} \end{bmatrix} \left\{ \left( \begin{bmatrix} w_{i_{11}} & w_{i_{21}} \\ w_{i_{12}} & w_{i_{22}} \end{bmatrix} \cdot \begin{bmatrix} \sqrt{p_{11}} & \sqrt{p_{21}} \\ \sqrt{p_{12}} & \sqrt{p_{22}} \end{bmatrix} \right) \begin{bmatrix} d_1 \\ d_2 \end{bmatrix} \right\} + \begin{bmatrix} n_1 \\ n_2 \end{bmatrix}$$

Equation 11

$$= \begin{bmatrix} h_{11}^{11} & h_{12}^{11} & h_{11}^{12} & h_{12}^{12} \\ h_{21}^{11} & h_{22}^{11} & h_{21}^{12} & h_{22}^{12} \\ h_{11}^{21} & h_{12}^{21} & h_{11}^{22} & h_{12}^{22} \\ h_{21}^{21} & h_{22}^{21} & h_{21}^{22} & h_{22}^{22} \end{bmatrix} \left\{ \left( \begin{bmatrix} w_1^{i11} & w_1^{i21} \\ w_2^{i11} & w_2^{i21} \\ w_1^{i12} & w_1^{i22} \\ w_2^{i12} & w_2^{i22} \end{bmatrix} \cdot \begin{bmatrix} \sqrt{p_{T_1} p_1} & \sqrt{p_{T_1}(1-p_1)} \\ \sqrt{p_{T_1} p_1} & \sqrt{p_{T_1}(1-p_1)} \\ \sqrt{p_{T_2}(1-p_2)} & \sqrt{p_{T_2} p_2} \\ \sqrt{p_{T_2}(1-p_2)} & \sqrt{p_{T_2} p_2} \end{bmatrix} \right) \begin{bmatrix} d_1 \\ d_2 \end{bmatrix} \right\} +$$

$$\begin{bmatrix} n_1^1 \\ n_2^1 \\ n_1^2 \\ n_2^2 \end{bmatrix}$$

$$= \begin{bmatrix} h_{11}^{11} & h_{12}^{11} & h_{11}^{12} & h_{12}^{12} \\ h_{21}^{11} & h_{22}^{11} & h_{21}^{12} & h_{22}^{12} \\ h_{11}^{21} & h_{12}^{21} & h_{11}^{22} & h_{12}^{22} \\ h_{21}^{21} & h_{22}^{21} & h_{21}^{22} & h_{22}^{22} \end{bmatrix} \begin{bmatrix} \sqrt{p_{T_1} p_1} w_1^{i11} & \sqrt{p_{T_1}(1-p_1)} w_1^{i21} \\ \sqrt{p_{T_1} p_1} w_2^{i11} & \sqrt{p_{T_1}(1-p_1)} w_2^{i21} \\ \sqrt{p_{T_2}(1-p_2)} w_1^{i12} & \sqrt{p_{T_2} p_2} w_1^{i22} \\ \sqrt{p_{T_2}(1-p_2)} w_2^{i12} & \sqrt{p_{T_2} p_2} w_2^{i22} \end{bmatrix} \begin{bmatrix} d_1 \\ d_2 \end{bmatrix} + \begin{bmatrix} n_1^1 \\ n_2^1 \\ n_1^2 \\ n_2^2 \end{bmatrix}$$

$$= \begin{bmatrix} H_{11} & H_{12} \\ H_{21} & H_{22} \end{bmatrix} \begin{bmatrix} w_{i_{11}} & w_{i_{21}} \\ w_{i_{12}} & w_{i_{22}} \end{bmatrix} \begin{bmatrix} d_1 \\ d_2 \end{bmatrix} + \begin{bmatrix} n_1 \\ n_2 \end{bmatrix}$$

$h_{ij}^{mn}$ denotes a downlink channel between the $j^{th}$ transmission antenna of the $n^{th}$ base station, and the $i^{th}$ reception antenna of the $m^{th}$ terminal.

$w_j^i mn$ denotes the $j^{th}$ component of a pre-coding vector mapped to the $i_{m\,n}^{th}$ index, which is suitable for a channel between the $n^{th}$ base station and the $m^{th}$ terminal. $P_{T\,n}$ denotes total transmit power of each antenna used in the $n^{th}$ base station, and $P_n$ denotes a power control level applied to the $n^{th}$ base station. And, $n_i^m$ denotes AWGN in the $i^{th}$ reception antenna of the $m^{th}$ terminal.

$\dot{W}$ $i_{m\,n}$ of the Equation 11, which is for maximizing a reception signal strength at a channel ($H_{m\,n}$) between the $n^{th}$ base station and the $m^{th}$ terminal is determined by the following Equation 12. And, the terminal transmits a codebook index ($i_{m\,n}$) mapped to the $\dot{W}$ $i_{m\,n}$ to the base station, thereby requesting a pre-coding process.

$$i_{mn} = \underset{k=1,\ldots,L}{\mathrm{argmax}}\{\|H_{mn}\dot{w}_k\|^2\} \qquad \text{Equation 12}$$

A signal received by the $m^{th}$ terminal can be expressed as the following Equation 13.

$$r_m = \begin{bmatrix} h_{11}^{m_1} & h_{12}^{m_1} & h_{11}^{m_2} & h_{12}^{m_2} \\ h_{21}^{m_1} & h_{22}^{m_1} & h_{21}^{m_2} & h_{22}^{m_2} \end{bmatrix} \begin{bmatrix} \sqrt{p_{T_1}p_1}w_1^{i_{11}} & \sqrt{p_{T_1}(1-p_1)}w_1^{i_{21}} \\ \sqrt{p_{T_1}p_1}w_2^{i_{11}} & \sqrt{p_{T_1}(1-p_1)}w_2^{i_{21}} \\ \sqrt{p_{T_2}(1-p_2)}w_1^{i_{12}} & \sqrt{p_{T_2}p_2}w_1^{i_{22}} \\ \sqrt{p_{T_2}(1-p_2)}w_2^{i_{12}} & \sqrt{p_{T_2}p_2}w_2^{i_{22}} \end{bmatrix} \begin{bmatrix} d_1 \\ d_2 \end{bmatrix} + \begin{bmatrix} n_1^m \\ n_2^m \end{bmatrix}$$

$$= \tilde{H}_m[\tilde{w}_1\ \tilde{w}_2]d + n_m$$

$$= \tilde{H}_m\tilde{w}_m d_m + \sum_{k=1,k\neq m}^{2} \tilde{H}_m\tilde{w}_k d_k + n_m$$

Equation 13

In the case of applying $1\times N_R$ reception signal process vectors, $u_m = (\tilde{H}_m\tilde{W}_m)^H$ using a selected pre-coding vector to the Equation 13, the following Equation 14 is obtained.

$$u_m r_m = \|\tilde{H}_m\tilde{w}_m\|^2 d_m + (\tilde{H}_m\tilde{w}_m)^H\left(\sum_{k=1,k\neq m}^{2}\tilde{H}_m\tilde{w}_k d_k + n_m\right) \qquad \text{Equation 14}$$

$$= \lambda_m d_m + n'$$

$\lambda_m$ denotes a beam forming gain obtained through cooperative transmission using power control. And, a reception Signal to Interference-plus-Noise Ratio (SINR) having AWGN signals and multi-user interference signals applied thereto can be expressed as the following Equation 15.

$$\gamma = \frac{\|\tilde{H}_m\tilde{w}_m\|^2}{\left\|\sum_{k=1,k\neq m}^{2}\tilde{H}_m\tilde{w}_k d_k + n_m\right\|^2} \qquad \text{Equation 15}$$

Differently from the conventional art, in the present invention, the beam forming gain ($\lambda_m$) is calculated through distributed discrete power control, thereby implementing an optimized closed loop MIMO system.

Hereinafter, the operation of an algorithm according to the present invention will be explained in more detail.

In the case of applying the distributed discrete power control ($D^2PC$) of the present invention by using the existing codebook in a cooperative system, transmission efficiency is enhanced, and both the conventional non-cooperative transmission and cooperative transmission can be executed.

A signal model of the present invention to which $D^2PC$ has been applied can be expressed as the Equation 11. And, a distributed discrete power control level ($P_n$) used in the $n^{th}$ base station, a core parameter of $\log_2$ $Q$ bit $D^2PC$ can be defined as a distributed discrete level, which is shown in the following Equation 16 as an example.

$$P_Q = \left\{p_n \mid p_n = \frac{q}{2(Q-1)} + \frac{1}{2},\ 0 \le q \le Q-1\right\} \qquad \text{Equation 16}$$

A $D^2PC$ level ($P_n$) can be enhanced through optimization in cooperative transmission environments. 1-bit, 2-bit and 3-bit $D^2PC$ levels when the Q is 2, 4 and 8, respectively can be expressed as follows.

$$P_2 = \left\{\frac{1}{2}, \frac{2}{2}\right\}$$

$$P_4 = \left\{\frac{3}{6}, \frac{4}{6}, \frac{5}{6}, \frac{6}{6}\right\}$$

$$P_8 = \left\{\frac{7}{14}, \frac{8}{14}, \frac{9}{14}, \ldots, \frac{14}{14}\right\}$$

In the case of applying $$P_1 = P_2 = \frac{1}{2}$$

to the $D^2PC$ level of the Equation 11, the MIMO system of the present invention operates in the same manner as the conventional cooperative transmission method in a closed loop MIMO system as shown in the following Equation 17.

$$\tilde{r} = \begin{bmatrix} h_{11}^{11} & h_{12}^{11} & h_{11}^{12} & h_{12}^{12} \\ h_{21}^{11} & h_{22}^{11} & h_{21}^{12} & h_{22}^{12} \\ h_{11}^{21} & h_{12}^{21} & h_{11}^{22} & h_{12}^{22} \\ h_{21}^{21} & h_{22}^{21} & h_{21}^{22} & h_{22}^{22} \end{bmatrix} \begin{bmatrix} \sqrt{p_{T_1} p_1} w_1^{i11} & \sqrt{p_{T_1}(1-p_1)} w_1^{i21} \\ \sqrt{p_{T_1} p_1} w_2^{i11} & \sqrt{p_{T_1}(1-p_1)} w_2^{i21} \\ \sqrt{p_{T_2}(1-p_2)} w_1^{i12} & \sqrt{p_{T_2} p_{12}} w_1^{i22} \\ \sqrt{p_{T_2}(1-p_2)} w_2^{i12} & \sqrt{p_{T_2} p_{12}} w_2^{i22} \end{bmatrix}$$

$$\begin{bmatrix} d_1 \\ d_2 \end{bmatrix} + \begin{bmatrix} n_1^1 \\ n_2^1 \\ n_1^2 \\ n_2^2 \end{bmatrix}$$

$$= \frac{1}{\sqrt{2}} \begin{bmatrix} h_{11}^{11} & h_{12}^{11} & h_{11}^{12} & h_{12}^{12} \\ h_{21}^{11} & h_{22}^{11} & h_{21}^{12} & h_{22}^{12} \\ h_{11}^{21} & h_{12}^{21} & h_{11}^{22} & h_{12}^{22} \\ h_{21}^{21} & h_{22}^{21} & h_{21}^{22} & h_{22}^{22} \end{bmatrix} \begin{bmatrix} \sqrt{p_{T_1}} w_1^{i11} & \sqrt{p_{T_1}} w_1^{i21} \\ \sqrt{p_{T_1}} w_2^{i11} & \sqrt{p_{T_1}} w_2^{i21} \\ \sqrt{p_{T_2}} w_1^{i12} & \sqrt{p_{T_2}} w_1^{i22} \\ \sqrt{p_{T_2}} w_2^{i12} & \sqrt{p_{T_2}} w_2^{i22} \end{bmatrix} \begin{bmatrix} d_1 \\ d_2 \end{bmatrix} +$$

$$\begin{bmatrix} n_1^1 \\ n_2^1 \\ n_1^2 \\ n_2^2 \end{bmatrix}$$

Equation 17

In the case of applying $$P_1 = P_2 = \frac{1}{2}$$

to the D²PC level, the MIMO system of the present invention operates in the same manner as the conventional non-cooperative transmission method of a closed loop MIMO system as shown in the following Equation 18.

$$\tilde{r} = \begin{bmatrix} h_{11}^{11} & h_{12}^{11} & h_{11}^{12} & h_{12}^{12} \\ h_{21}^{11} & h_{22}^{11} & h_{21}^{12} & h_{22}^{12} \\ h_{11}^{21} & h_{12}^{21} & h_{11}^{22} & h_{12}^{22} \\ h_{21}^{21} & h_{22}^{21} & h_{21}^{22} & h_{22}^{22} \end{bmatrix} \begin{bmatrix} \sqrt{p_{T_1}} w_1^{i11} & 0 \\ \sqrt{p_{T_1}} w_2^{i11} & 0 \\ 0 & \sqrt{p_{T_2}} w_1^{i22} \\ 0 & \sqrt{p_{T_2}} w_2^{i22} \end{bmatrix}$$

$$\begin{bmatrix} d_1 \\ d_2 \end{bmatrix} + \begin{bmatrix} n_1^1 \\ n_2^1 \\ n_1^2 \\ n_2^2 \end{bmatrix}$$

Equation 18

That is, in the present invention, an optimized transmission method can be implemented according to the value, P. And, the transmission method of the present invention can operate as a cooperative transmission method or a non-cooperative transmission method.

As aforementioned, the transmission method of the present invention can operate as a cooperative transmission method or a non-cooperative transmission method according to a determined D²PC level. Preferably, communication efficiency can be maximized through optimization.

The D²PC is generally executed by the base station, but may be also executed by the terminal.

Hereinafter, preferred embodiments of the present invention will be explained according to the subject which executes the D²PC.

In optimizing a reception signal vector through the D²PC, the value of P has to be determined. Here, the D²PC level may be determined by the base station according to one embodiment of the present invention, or the D²PC level may be determined by the terminal according to another embodiment of the present invention.

Figure 4:
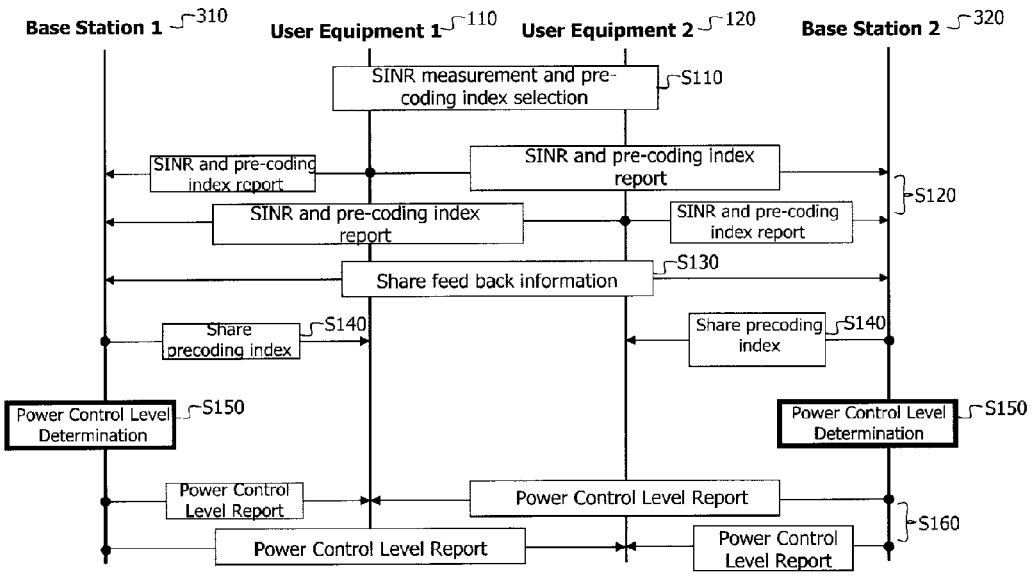
FIG. 4 is a configuration view showing a method for determining a distributed discrete power control level by a base station according to one embodiment of the present invention.

FIG. 4 is a configuration view showing a method for determining a distributed discrete power control level by the base station according to one embodiment of the present invention.

Referring to FIG. 4, each terminal measures a reception Signal to Interference-plus-Noise Ratio (SINR) and determines a pre-coding index for communication (S110). A first terminal estimates an SINR of a signal received from a second base station through a channel. And, a second terminal estimates an SINR of a signal received from a first base station through a channel.

Each terminal determines a pre-coding index capable of maximizing a reception signal strength, by using power control level information used in the base station, and channel estimation information of a reception signal, based on channel information of each base station participating in cooperative transmission.

Each terminal reports the measured SNR and the determined pre-coding index to adjacent base stations (S120). In the case that an uplink feedback channel is defined between one terminal and one base station, only a base station having the most excellent channel environment or which is the closest one may be reported with feedback information.

The base stations may share the SNR and the pre-coding index information transmitted from each terminal, with other base station through a backbone network (S130). The sharing may be also performed through an additional wired or wireless channel having a good signal quality.

Through the sharing information between the base stations, the base stations inform the pre-coding index of the first terminal for multi-user transmission, to the second terminal grouped with the first terminal (S140). The base station participating in cooperative transmission shares pre-coding index information used in one terminal having the most excellent channel environment or located closest to the base station, with other terminals which belong to a set grouped with the one terminal, based on a downlink feedback channel.

Accordingly, each terminal simultaneously shares the pre-coding index information used in other terminals. That is, referring to FIG. 4, the first base station shares the pre-coding index with the first terminal adjacent thereto, and the second base station shares the pre-coding index with the second terminal adjacent thereto.

Each base station determines a distributed discrete power control (D2PC) level based on the information (S150).

The method for determining a D2PC level to be used in each base station includes a method for allocating much power to a base station having high reception signal power to be received by each terminal, and a method for allocating the same signal power to each base station by requesting a base station having low signal power so as to have increased signal power.

In the case of allocating much power to a base stations having high signal power, signal power is allocated in a similar manner to a maximal ratio transmission method. In the case of allocating much power to a base station having low signal power, signal power is transmitted to each terminal from each base station by the same amount (equal gain reception). And, a pre-coding vector to be cooperatively transmitted from each base station operates so as to be advantageous to orthogonality between interfering pre-coding vectors.

The method for allocating much power to a base station having high signal power to be received by each terminal will be explained with reference to FIG. 6.

Figures 6, 7:
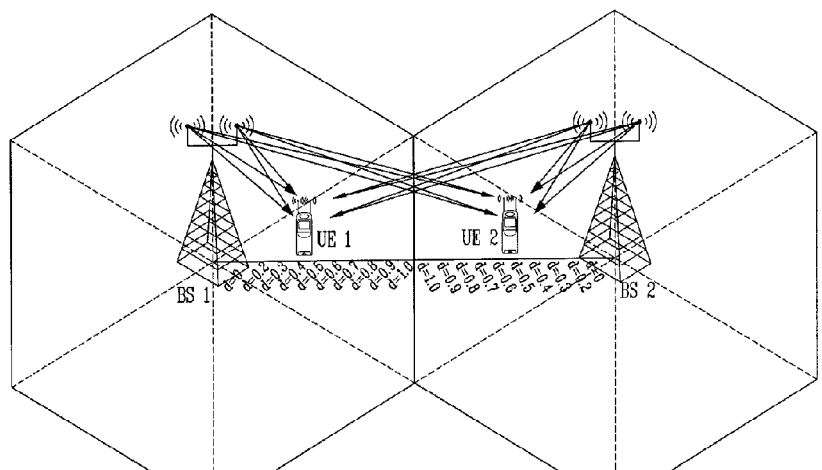
FIG. 6 shows diagrams for determining a distributed discrete power control level.
FIG. 7 is a view comparing MIMO system capacities according to the position of a terminal according to the present invention.

FIG. 6 shows diagrams for determining a distributed discrete power control level.

Base stations participating in cooperative transmission determine a distributed discrete power control level based on an SINR of each terminal, and the diagrams of FIG. 6. For instance, when it is assumed that SINR information between the $n^{th}$ base station and the $m^{th}$ terminal reported from the $m^{th}$ terminal is $\gamma_{mn}$ , $\hat{p}$ (x,y) for determining a distributed discrete power control level can be defined as the following Equation 19.

$$\hat{p}(x, y) = \hat{p}\left(\frac{\gamma_{11}}{\gamma_{12}}, \frac{\gamma_{22}}{\gamma_{21}}\right)$$ Equation 19

$\gamma_{11}$
and
$\gamma_{22}$
denote an SINR of a terminal having the most excellent channel environment (or closest to a base station), which satisfy
$\gamma_{11}$
$\geq$
$\gamma_{12}$
and
$\gamma_{22}$
$\geq$
$\gamma_{21}$
on the average. Accordingly,
$\gamma_{11}/\gamma_{12}$
and
$\gamma_{22}/\gamma_{21}$
have values more than 1. Based on these characteristics, the diagrams shown in FIG. 6 can be utilized.

Referring to FIG. 6, in an assumption that each terminal knows all channels between $BS_1$ (base station) and $MS_1$ (mobile station: terminal), between $BS_1$ and $MS_2$, between $BS_2$ and $MS_1$, and between $BS_2$ and $MS_2$, a distributed discrete power control level is determined based on four pre-coding indexes and two distributed discrete power control levels to be transmitted from each base station to each terminal.

$\gamma_{11}/\gamma_{12}$
,
$\gamma_{22}/\gamma_{21}$,
and the distributed discrete power control levels when sum rates of the $MS_1$ and the $MS_2$ are maximized are calculated on the average, thereby determining a distributed discrete power control value through the diagrams shown in FIG. 6.

When the
$\gamma_{11}/\gamma_{12}$
or
$\gamma_{22}/\gamma_{21}$
has a value less than 1, the terminal is located at a border between cells. In this case, a distributed discrete power control level of
$\hat{p}$
(x,y)=0 is determined to operate the MIMO system based on a general cooperative transmission method. On the contrary, when the
$\gamma_{11}/\gamma_{12}$
or
$\gamma_{22}/\gamma_{21}$
has a value more than 20, one or more terminals are located at a border between cells. In this case, a distributed discrete power control level of
$\hat{p}$
(x,y)=0 is determined to operate the MIMO system based on a general cooperative transmission. On the contrary, when
$\gamma_{11}/\gamma_{12}$
or
$\gamma_{22}/\gamma_{21}$
has a value more than 20, one or more terminals are located near the base stations. In this case, a distributed discrete power control level of
$\hat{p}$
(x,y)=3 is determined to operate the MIMO system based on a general non-cooperative transmission. In the case that each terminal has two reception antennas and x=10 and y=6,
$\hat{p}$
(10,6)=2 is selected as a $D^2PC$ level by using the diagrams shown in FIG. 6. In this manner, $P_n$ having been determined by the $n^{th}$ base station is determined as a distributed discrete power control level by using the diagrams shown in FIG. 6.

Once the distributed discrete power control level has been determined, the base stations report feedback information of the distributed discrete power control level to the respective terminals (S160).

In the above embodiment, the terminals report the SINR and pre-coding index to all the adjacent base stations. However, this procedure may be modified according to circumstances. For instance, each terminal may report feedback information to one base station closest thereto, and each base station may report the feedback information to all the terminals. Alternatively, each terminal may report feedback information to one base station closest thereto, and each base station may report the feedback information to one terminal closest thereto.

Figure 5:
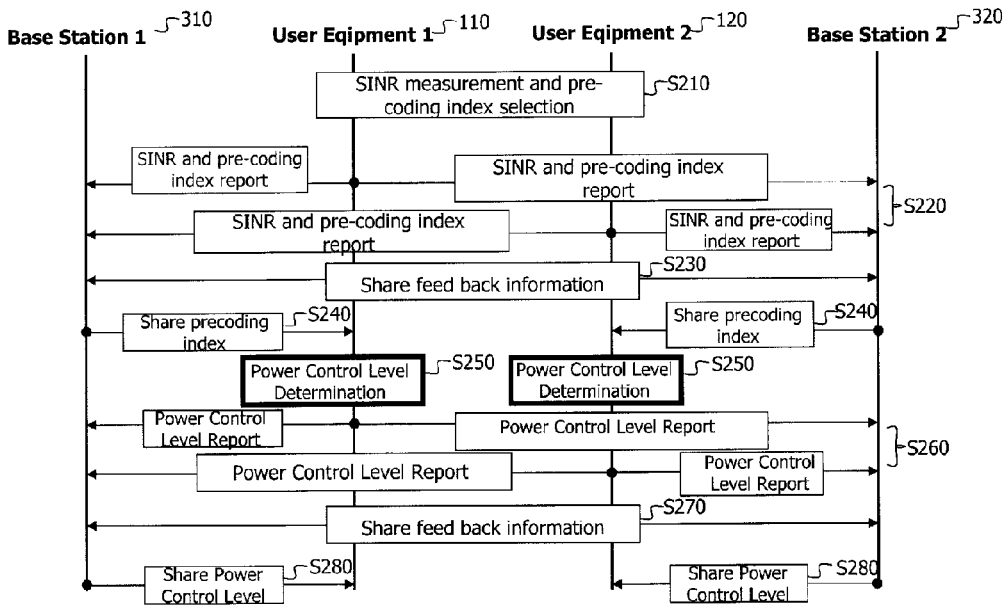
FIG. 5 is a configuration view showing a method for determining a distributed discrete power control level by a terminal according to another embodiment of the present invention.

FIG. 5 is a configuration view showing a method for determining a distributed discrete power control level by the terminal according to another embodiment of the present invention.

Referring to FIG. 5, each terminal measures a reception Signal to Interference-plus-Noise Ratio (SINR) and determines a pre-coding index for communication (S210). S210 is performed in the same manner as S110 in FIG. 4.

Each terminal reports the measured SINR and the determined pre-coding index to its adjacent base stations (S220). S220 is also performed in the same manner as S120 in FIG. 4. The base stations may share the SINR and the pre-coding index information transmitted from each terminal, with other base stations through a backbone network (S230).

Through the sharing information between the base stations, the base stations share the pre-coding index with other terminals grouped with each other for multi-user transmission in the same manner as S140 in FIG. 4 (S240).

Each terminal determines a distributed discrete power control level based on the pre-coding index information (S250).

The method for determining a distributed discrete power control level shown in FIG. 5 is performed in the same manner as the method for determining a distributed discrete power control level shown in FIG. 4.

Once a distributed discrete power control level has been determined, each terminal reports feedback information of the determined distributed discrete power control level to each base station (S260). Each terminal reports the determined distributed discrete power control level to one base station having the most excellent channel environment (the closest base station) through an uplink channel. Each base station transmits a signal to the terminal based on the distributed discrete power control level reported from the terminal.

The distributed discrete power control level feedback information reported from the terminal is shared with each base station through a backbone network (S270). The sharing may be also performed through an additional wired or wireless channel having a good signal quality.

Each base station shares the determined distributed discrete power control level feedback information with each terminal, based on the shared distributed discrete power control level feedback information (S280). That is, the distributed discrete power control level feedback information is shared with terminals belonging to a multi-user group which simultaneously receives a signal through a cooperative multi-user transmission method. The base station belonging to cooperative transmission transmits distributed discrete power control level information used by other base stations belonging to the cooperative transmission, to one terminal having the most excellent channel environment (i.e., the closest terminal) through a downlink channel. Through these procedures, each terminal can be provided with distributed discrete power control levels used in all the base stations belonging to cooperative transmission. And, the information is utilized for data restoration using a reception signal of the terminal.

In the above embodiment, the terminals report the SINR and pre-coding index to all the adjacent base stations. However, this procedure may be modified according to circumstances. For instance, each terminal may report feedback information to a base station closest thereto.

For explanations of effects of the present invention, simulations have been performed.

For the simulations, a multi-cell mobile communication system having M×N=2×4 channels was assumed. In the multi cell mobile communication system, two base stations (B=2) each having two antennas ($N_T$=2), and two terminals (K=2) each having one antenna ($N_R$=1) were used, and 19 cells were used.

In the present experiments, each base station that determines the distributed discrete power control level. The same total power, $P_{T\,1}=P_{T\,2}=1$ is allocated to the antennas of each base station. And, it is assumed that all the base stations have the same distributed discrete power control level ($P_1=P_2$).

As a pre-coding technique applied to the simulations, a Discrete Fourier Transform base codebook; DFT-based codebook is used.

The DFT-based codebook is utilized to generate a pre-coding vector used to apply a beam forming technique in a closed loop MIMO system, and may be generated by applying a pre-coding vector ($W_K$) to be used in $N_T$ transmission antennas to a Discrete Fourier Transform Matrix ($W_M^{N_T}$).

FIG. 7 is a view comparing MIMO system capacities according to the position of the terminal according to the present invention.

Referring to FIG. 7, in an assumption that a distance between a base station and the $m^{th}$ terminal is $d_m$, in the case that the terminal is positioned on a straight line between a base station position ($d_m$=0) and a cell border position ($d_m$=1), MIMO system capacities were measured. The MIMO system capacities were measured according to three positions (L1, L2 and L3) of the two terminals. Here, 'L1' denotes a position where the two terminals are located at a cell border, and 'L2' denotes a position where one terminal is located at a cell border whereas another terminal is located near the base station. And, 'L3' denotes a position where the two terminals are located near the base stations.

Referring to the table of FIG. 7, "2+2" signifies that each base station has used two bits for one terminal, and thus four bits has been totally used. And, "2+2+1" or "2+2+2" signifies that each base station has used two bits for one terminal and thus four bits has been totally used, and a distributed discrete power control level having 1 or 2-bit has been used.

As can be seen from the table of FIG. 7, in the case of using the distributed discrete power control, MIMO system capacity of the present invention was enhanced more than the conventional MIMO system capacity based on a non-cooperative transmission (NCT) and cooperative transmission (CT). Especially, the MIMO system capacity was similar to that based on cooperative transmission in the 'L1', and was similar to that based on non-cooperative transmission in the 'L3'.

Figure 8:
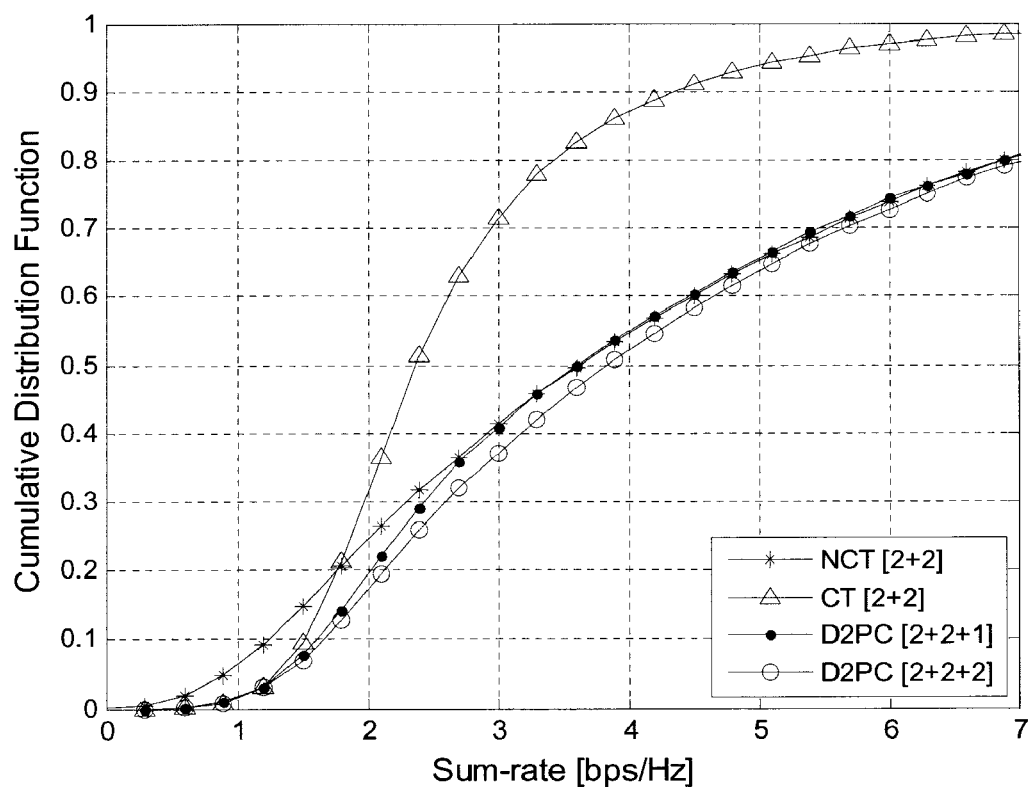
FIG. 8 is a view comparing MIMO system capacities when two terminals are constantly positioned within each coverage of two base stations participating in cooperative transmission.

FIG. 8 is a view comparing MIMO system capacities when two terminals are constantly disposed within each coverage of two base stations participating in cooperative transmission.

FIG. 8 shows sum rates of two terminals having an SINR less than $\lambda_{t\,h}$=3 d B (an outage threshold) and receiving signals from two base stations through a cooperative transmission method.

As can be seen from FIG. 8, in the case of using the distributed discrete power control method of the present invention, the MIMO system capacity was enhanced in all the terminals. And, the terminals having a reception rate of 20% have obtained the sum rate gains more than 0.4 bps/Hz.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for data transmission based on distributed discrete power control among a plurality of transmitting entities in a closed loop cooperative multi-user multi-input multi-output (MIMO) system, the method comprising:
  coding and modulating, by a transmitting entity among the plurality of transmitting entities, a signal to be transmitted;
  receiving, by the transmitting entity, feedback information from a terminal among a plurality of terminals grouped for multi-user transmission;
  sharing, by the transmitting entity, a pre-coding index with the plurality of terminals, based on the feedback information;
  determining, by the transmitting entity, a plurality of distributed discrete power control levels for the plurality of transmitting entities based on the feedback information, wherein each of the plurality of distributed discrete power control levels is for use by each respective transmitting entity of the plurality of transmitting entities for a cooperative transmission; and
  transmitting, by the transmitting entity to the terminal, the signal according to one of the determined plurality of distributed discrete power control levels,
  wherein the plurality of distributed discrete power control levels are determined by performing a Hadamard product with respect to a transmission signal and a distributed discrete power control matrix.

2. The method of claim 1, wherein the feedback information includes a reception Signal to Interference-plus-Noise Ratio (SINR) of the terminal, and the pre-coding index of a pre-coding book of the terminal.

3. The method of claim 2, wherein the distributed discrete power control matrix is determined based on at least:
  allocating more power to a transmitting entity among the plurality of transmitting entities having higher signal power to be received by each terminal; or
  allocating the same signal power to each transmitting entity of the plurality of transmitting entities by requesting a transmitting entity among the plurality of transmitting entities having lower signal power so as to have increased signal power.

4. The method of claim 2, wherein the pre-coding book is a Discrete Fourier Transformation (DFT) based codebook.

5. A transmitting entity for data transmission based on distributed discrete power control among a plurality of transmitting entities in a closed loop cooperative multi-user multi-input multi-output (MIMO) system, the transmitting entity comprising:
  a receiver configured to receive feedback information from a terminal among a plurality of terminals grouped for multi-user transmission;
  a transmitter; and
  a processor configured to:
    perform coding and modulating processes with respect to a signal to be transmitted;
    share a pre-coding index with the plurality of terminals, based on the feedback information; and
    determine a plurality of distributed discrete power control levels for the plurality of transmitting entities based on the feedback information, wherein each of the plurality of distributed discrete power control levels is for use by each respective transmitting entity of the plurality of transmitting entities for a cooperative transmission,
  wherein the transmitter is configured to transmit, to the terminal, the signal according to one of the determined plurality of distributed discrete power control levels, and
  wherein the plurality of distributed discrete power control levels are determined by performing a Hadamard product with respect to a transmission signal and a distributed discrete power control matrix.

6. The transmitting entity of claim 5, wherein the feedback information includes a reception Signal to Interference-plus-Noise Ratio (SINR) of the terminal, and the pre-coding index of a pre-coding book of the terminal.

7. The transmitting entity of claim 6, wherein the distributed discrete power control matrix for determining the plurality of distributed power control levels is determined based on at least:
  allocating more power to a transmitting entity among the plurality of transmitting entities having higher signal power to be received by each terminal of the plurality of terminals; and
  allocating the same signal power to each transmitting entity among the plurality of transmitting entities by requesting a transmitting entity among the plurality of transmitting entities having lower signal power so as to have increased signal power.

8. The transmitting entity of claim 6, wherein the pre-coding book is a Discrete Fourier Transformation (DFT) based codebook.

9. A method for data transmission based on distributed discrete power control among a plurality of transmitting entities in a closed loop cooperative multi-user multi-input multi-output (MIMO) system, the method comprising:
  determining, by a terminal among a plurality of terminals grouped for multi-user transmission, feedback information;
  transmitting the determined feedback information to a transmitting entity among the plurality of transmitting entities;
  determining, by the terminal, a plurality of distributed discrete power control levels for the plurality of transmitting entities based on the feedback information, wherein each of the plurality of distributed discrete power control levels is for use by each respective transmitting entity of the plurality of transmitting entities for a cooperative transmission; and
  receiving, by the terminal from the transmitting entity, a signal according to one of the determined plurality of distributed discrete power control levels,
  wherein the plurality of distributed discrete power control levels are determined by performing a Hadamard product with respect to a transmission signal and a distributed discrete power control matrix.

10. The method of claim 9, wherein the feedback information includes a reception Signal to Interference-plus-Noise Ratio (SINR) of the terminal, and a pre-coding index of a pre-coding book of the terminal.

11. A terminal for data transmission based on distributed discrete power control among a plurality of transmitting entities in a closed loop cooperative multi-input multi-output (MIMO) system, the terminal comprising:
  a receiver;
  a transmitter; and
  a processor, wherein the terminal is among a plurality of terminals grouped for multi-user transmission,
wherein the processor is configured to:
   determine feedback information; and
   determine a plurality of distributed discrete power control levels for the plurality of transmitting entities based on the feedback information, wherein each of the plurality of distributed discrete power control levels is for use by each respective transmitting entity of the plurality of transmitting entities for a cooperative transmission,
wherein the transmitter is configured to transmit the determined feedback information to a transmitting entity among the plurality of transmitting entities,
wherein the receiver is configured to receive a signal from the transmitting entity according to one of the determined plurality of distributed discrete power control level levels, and
wherein the plurality of distributed discrete power control levels are determined by performing a Hadamard product with respect to a transmission signal and a distributed discrete power control matrix.

12. The terminal of claim 11, wherein the feedback information includes a reception Signal to Interference-plus-Noise Ratio (SINR) of the terminal, and a pre-coding index of a pre-coding book of the terminal.

* * * * *